United States Patent [19]

Verbeek et al.

[11] Patent Number: 4,742,534

[45] Date of Patent: May 3, 1988

[54] TELEPHONE RECEIVING EQUIPMENT FOR RECOGNIZING PREDETERMINED COMBINATIONS OF VOICE-FREQUENCY SIGNALLING COMPONENTS

[75] Inventors: Robert J. M. Verbeek; Rudolf Van Bokhorst; Hendrikus J. Dekker; Johannes H. M. Velthof, all of Hilversum, Netherlands

[73] Assignee: U.S. Philips Corp., New York, N.Y.

[21] Appl. No.: 884,702

[22] Filed: Jul. 11, 1986

[30] Foreign Application Priority Data

Jul. 12, 1985 [NL] Netherlands .................. 8502008

[51] Int. Cl.⁴ ............................................. H04L 5/06
[52] U.S. Cl. ..................................... 375/89; 364/726; 379/284; 340/825.74
[58] Field of Search .......................... 375/89, 94, 48; 364/724, 726; 379/283, 284; 340/825.73, 825.74

[56] References Cited

U.S. PATENT DOCUMENTS

| | | | |
|---|---|---|---|
| 4,025,730 | 5/1977 | Sawai | 379/283 |
| 4,080,661 | 3/1978 | Niwa | 364/726 |
| 4,223,185 | 9/1980 | Picou | 364/726 |
| 4,334,273 | 6/1982 | Ikeda | 379/283 |
| 4,355,405 | 10/1982 | Ruys et al. | 375/48 |
| 4,479,229 | 10/1984 | Wolters | 340/825.74 |
| 4,614,909 | 9/1986 | Jarvfalt | 379/386 |
| 4,669,114 | 5/1987 | Reesor et al. | 379/231 |

Primary Examiner—Robert L. Griffin
Assistant Examiner—Stephen Chin
Attorney, Agent, or Firm—Thomas A. Briody; Jack Oisher

[57] ABSTRACT

A telephone signalling receiver comprising speech detectors for respective voice-frequency signalling components of push-button (TDK) signals which are in a frequency band divided into lower and upper frequency subgroups. Each detector calculates the Discrete Fourier Transform (DFT) of the corresponding signal frequency component, the frequency characteristic of such detector having a main lobe for such signalling frequency component and two side lobes. Such calculation employs DFT product coefficients calculated for the lower and upper frequency subgroups and which are stored in memories, such coefficients being for particular Kaiser-Bessel window functions and for pairs of frequencies in the lower and higher subgroups. The coefficients are selected so that the peaks of the side lobes are lower, such as 6 dB below, the peaks of the associated main lobes. A processor adds the outputs of all detectors other than those for the two signalling components which are received with the greatest strength, and a comparator compares the sum so derived with a fixed noise threshold. Such speech detectors provide increased bandwidth in the upper and lower frequency subgroups for guarding against spurious voice signals, while improving the selectivity in such subgroups.

11 Claims, 3 Drawing Sheets

TELEPHONE RECEIVING EQUIPMENT FOR RECOGNIZING PREDETERMINED COMBINATIONS OF VOICE-FREQUENCY SIGNALLING COMPONENTS

BACKGROUND OF THE INVENTION

1. Field of the Invention

The invention relates to telephone receiving equipment which is adapted to recognize out of incoming signals a number of different frequency combinations, of a number of nominal voice-frequency signalling components. To this end such a receiving equipment contains a number of mutually different Discrete Fourier Transform (DFT) digital signal-processing devices each having a frequency response characteristic the top of whose main lobe corresponds to one of such nominal voice-frequency signalling components situated within one of two frequency band subgroups into which such voice-frequency signalling components are divided; and a processor which processes the results provided by the digital signal processing devices to detect the two nominal voice-frequency signalling components that are received with the greatest strength, and evaluates the other of such results so as to provide a voice-signal guard function.

2. Description of the Related Art

Such a receiving equipment is known from published Netherlands patent application 8200051, which corresponds to U.S. Pat. No. 4,479,229. This describes an equipment for receiving multifrequency code (MFC) signals and which is provided with DFT signal processing devices in which provisions are made to secure immunity against single spurious signal frequencies. These signal-guard provisions are not suitable for voice-signal protection. Such devices are further equipped so as to reduce to a minimum the extra computing time required.

U.S. Pat. No. 4,355,405 describes a receiver for pushbutton signalling (TDK). Such receiver comprises eight different digital signal-processing devices in the form of digital filters for the eight voice-frequency signalling components that are customary in such a signalling system. Such filters are implemented in this case in the form of "Finite Impulse Response" filters whose results are used on the one hand for detecting the relevant frequency combinations of signalling components, and on the other hand for fulfilling a voice-signal guard function. In this prior art it is proposed to add a side lobe to each filter transfer characteristic. The frequencies corresponding to the tops of these side lobes are chosen in such a way that one side-lobe top frequency is added concurrently to the four pairs of nominal pushbutton signalling frequencies, i.e. the pairs 697, 770; 852, 941; 1209, 1336; and 1477, 1633. Such side lobe top frequencies are 1040 for the first pair, 640 for the second pair, 580 for the third pair and 1100 for the fourth pair. A filter system implemented in this way has the drawback that there are gaps in the voice-frequency spectrum which it analyses. This means that certain voice or spurious signal components, or a combination of nominal signalling components, can produce imitations or cause the rejection of an incoming validating combination of nominal signalling components. Furthermore the selectivity of the filter characteristics thus divided over the frequency range is unsatisfactory. Nor does the literature referred to deal with provisions that would provide immunity in such pushbutton signalling against single spurious signal frequencies.

SUMMARY OF THE INVENTION

The object of the invention is to meet the deficiencies of the prior art according to the above-mentioned published Netherlands patent application by providing a receiving equipment for pushbutton signalling (TDK) which has an effective voice-signal guard that is superior to the one known from the U.S. Pat. No. 4,355,405.

To this end the receiving equipment according to the invention is characterized in that the frequency response characteristic of each of the DFT digital signal-processing devices has a first side lobe and a second side lobe, each with one top, the top of the first side lobe and the top of the second side lobe being situated respectively below and above the frequency band of the subgroup to which the relevant nominal signalling frequency component belongs;. The processor is equipped (a) for repeatedly adding together the results provided by a number $(s-2)$ of the DFT devices in such a way that a sum result is obtained that is representative of the total energy content of all detected input signals other than two nominal voice-frequency signalling components that are received with the greatest strength, and (b) for comparing this sum result with a threshold value which is derived from one of said two nominal voice-frequency signalling components that are received with the greatest strength. Such a receiving equipment designed for touch-tone signalling according to the invention in fact determines for the spurious-signal/voice-signal guard function the signal-to-noise ratio between a detected frequency combination of two nominal signalling components and the signal that corresponds to the energy content of the six other detectors, whereby this signal-to-noise ratio is compared with the derived threshold signal. When it appears from such a comparison that this signal-to-noise ratio is too low, the detected frequency combination of the relevant two signalling components is rejected.

In a spurious-signal/voice-signal guard device implemented in this manner the effectiveness of the guard function is in particular dependent on the size of the frequency band analysed. This means that the frequency response characteristic of each of the DFT devices must be as broad as possible. On the other hand such a frequency response characteristic should introduce a sufficiently high attenuation for the neighbouring nominal frequency of the same subgroup. In connection with these considerations a receiving equipment according to the invention is further characterized in that each of the digital signal processing devices is constructed so that, at the minimum frequency distance between a relevant nominal signalling frequency component and a frequency that limits the detection bandwidth of the nearest neighbouring nominal signalling frequency component, an attenuation is introduced which in the main has one and the same magnitude.

In such a device all detectors for the nominal voice-frequency signalling components of the subgroup covering the lowest frequency band are in fact effective for introducing at the minimum frequency distance to the relevant neighbouring frequency an identical attenuation value, as a result of which the bandwidth of these detectors is as broad as possible.

A receiving equipment according to the invention is further characterized in that in each of the digital signal processing devices the tops of the relevant two side lobes are approximately 6 dB lower than the top of the corresponding main lobe.

With such an embodiment the amplitude of a relevant side lobe may typically be $1/\sqrt{3}$ times the amplitude of the corresponding main lobe. In this way it is achieved that in each frequency band the level of the signals obtained from the added side lobes is equal to that of the signals of the main lobes.

In order in an effective manner to meet the imposed requirements, a receiving equipment according to the invention is further characterized in that the shape of the frequency response characteristic of each of the digital processing devices is determined by a window function of the kind known as the Kaiser-Bessel function.

Such window functions and their application in combination with discrete Fourier transforms are generally known, for example from an article by F. J. Harris "On the use of windows for harmonic analysis with the discrete Fourier transformation", published in Proceedings of the IEEE, Vol. 66, No. 1, January 1978.

A preferred embodiment of a receiving equipment according to the invention is further characterized in that in the digital signal processing devices the frequencies of the tops of the side lobes that are added to the subgroup with the lowest and highest frequency band, respectively, are located at respectively 603 and 1039 Hz and 1107 and 1805 Hz.

It has been found that for pushbutton (TDK) signalling detection the recommended number of samples of the signal to be analysed is N=256. It has also been found that for detection in an MFC system it is recommendable to use N=128 samples. A receiving equipment as known from the aforesaid published Netherlands patent application is provided with an input member device for the temporary storage of a number of samples of a presented signal. In connection with the desired compatibility, a receiving equipment according to the invention is further characterized in that read-out means are provided for alternately reading out half the number of samples stored in the memory device, provided that upon each read-out the most neighbouring sample of a read-out sample is negated.

With such a device the sampling frequency is in fact halved from e.g. 8000 Hz to 4000 Hz. In this way the shape of a frequency response characteristic is not affected, although the frequency response in connection with the spurious signal/voice signal guard function, is favourable since it has in fact the effect of doubling the frequency band analysed for voice signals.

BRIEF DESCRIPTION OF THE DRAWINGS

The invention will be explained in more detail, together with an example of an embodiment thereof, with reference to the drawings in which.

DESCRIPTION OF THE PREFERRED EMBODIMENT

Figure 1:
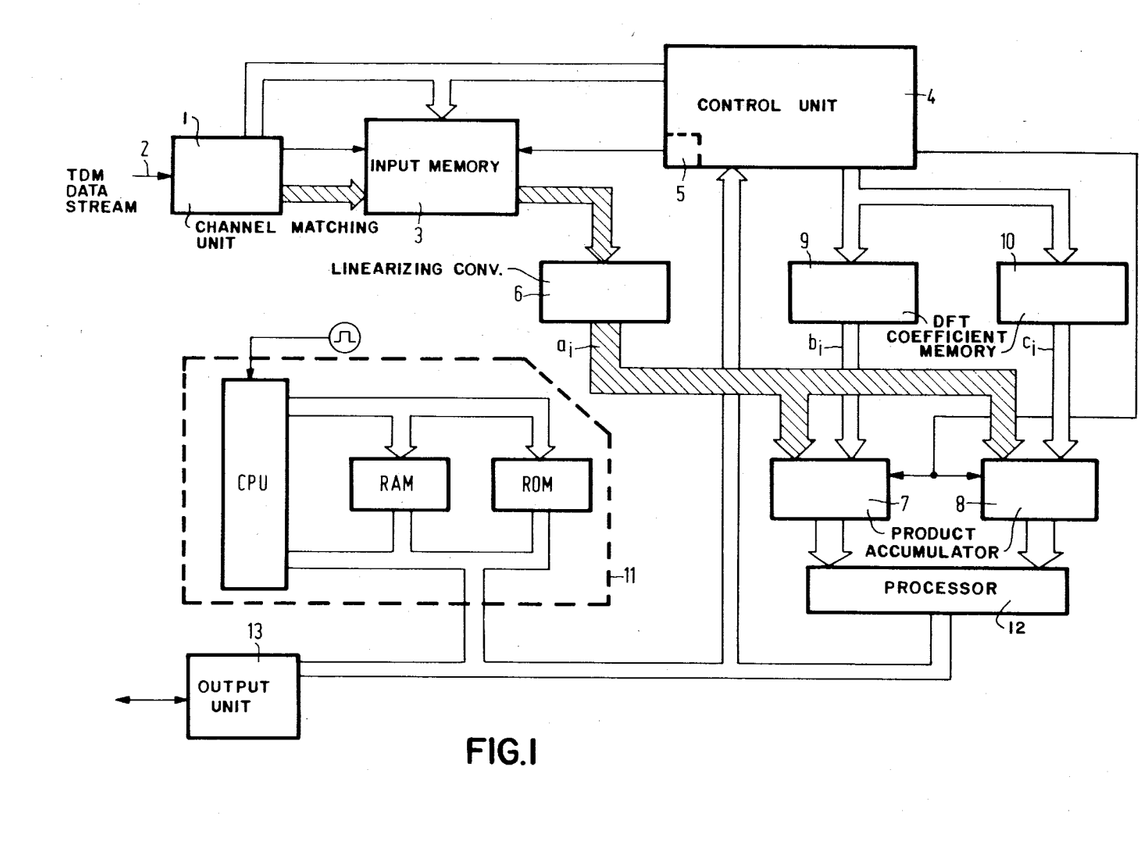
FIG. 1 shows a greatly simplified block diagram of a physical component structure illustrating an exemplary embodiment of a receiving equipment according to the invention.

The design of the example of an embodiment of a receiving equipment according to the invention, shown schematically in FIG. 1, is based on the following considerations:

1. For detection of the nominal voice-frequency signalling components a discrete Fourier transformation (DFT) is carried out for each of the eight nominal signalling frequencies which are usual in a tone push-button signalling system (TDK system).

2. Use is also made of DFT for fulfilling the spurious-signal/voice-signal guard function.

3. Kaiser-Bessel window functions are used in the implementation of the various DFT's.

4. The various DFT's are implemented in overlapping form.

5. A digital signal processing device is available which calculates the real and the imaginary part of a DFT over a maximum number of 128 samples in a frame time interval of normally 125 µs. Such a digital signal processing device operates in essence as a numerical series multiplier for implementing the operation:

$$S = \sum_{i=0}^{N-1} a(i) * b(i)$$

where a(i) is the signal input sample and b(i) and c(i) are quantities yet to be described, a(i) and b(i) being respectively a word (number) with a width of 16 and 8 bits respectively. For the sum S a word width of 24 bits is available.

For the implementation of each of the 8 DFT's a time interval of $8 \times 125$ µs = 1 ms is therefore needed, using 8 digital signal processing devices of this physical unit. This offers the practical advantage of having one digital signal processing device for determining the DFT's of the eight nominal frequencies and of using these eight times in time division multiplex. It is further of advantage to make common use of the detection part, as shown schematically in FIG. 1, for eight channels stacked in time-division multiplex. In this way new information about the input signal can be obtained every eight milliseconds. As will presently be explained in more detail, the implementation of a DFT for each of the frequency/channel combinations requires a number of 256 samples. Since each of these samples appears after every time interval of 125 µs, this implies an acquisition interval of $256 \times 125$ µs = 32 ms. By overlapping the detection processes of the eight time-division multiplex stacked channels, this means that for each DFT an "old" signal segment corresponding to an acquisition interval of 24 ms is involved and a "new" signal segment corresponding to an acquisition interval of 8 ms.

The receiving equipment shown schematically in FIG. 1 can be used in common for a number of eight channels stacked in time-division multiplex. Signalling can take place through each of these channels with the codes customarily used for touch-tone signalling. These codes are composed of combination of two voice-frequency signalling components, these being a component from a lower group containing the frequencies 697; 770; 852; and 941, and a component from an upper group containing the frequencies 1209; 1336; 1477; and 1633.

Figure 2:
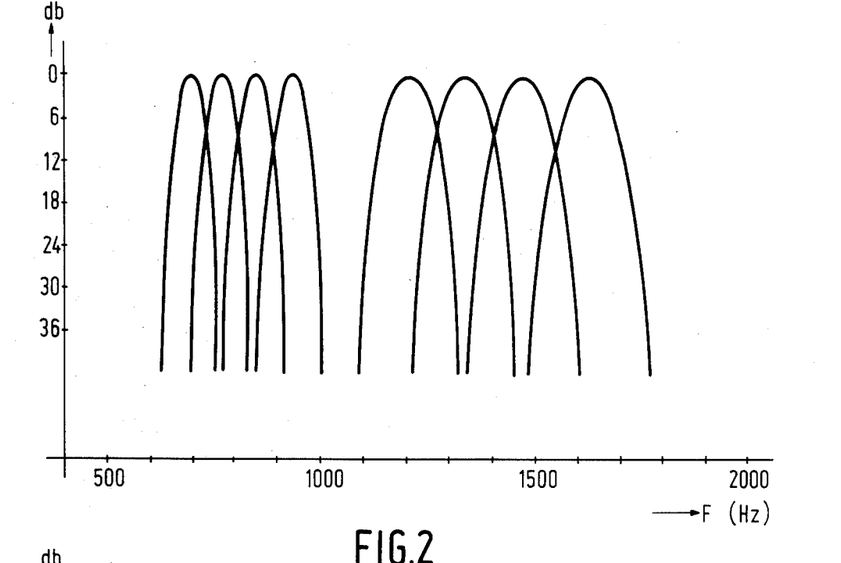
FIG. 2 shows a family of frequency response characteristics of DFT devices usable for pushbutton signalling detection.

The block 1 is a data channel matching unit via which the data stream entering at input 2, which stream comprises the eight channels stacked in time-division multiplex, is matched to the input of the receiver. It is assumed that these signals are available in each channel as pulse-code modulated (PCM) signals. The signalling receiver shown in FIG. 1 therefore comprises in essence eight digital signal processing devices each with a frequency response characteristic wherein a main lobe has its maximum or top centred at the relevant voice-frequency signalling component to be detected, which are referred to hereinafter as the nominal signalling frequencies. FIG. 2 shows the situation of this set of main lobes of the frequency response characteristics of these DFT devices for the frequency scheme normally used for pushbutton signalling with the two subgroups defined in the foregoing, each with four nominal signalling frequencies. There is thus a low-band subgroup and a highband subgroup. Such a digital signal processing device operates on a series of numbers presented at its input, each of which represents a sample of the signal to be analysed, and uses a discrete Fourier transform to transform this series into a frequency response of said series of input signals. In a signalling receiver according to the present patent application, this is implemented by the application of a discrete Fourier transformation (DFT), calculated in each case for a value $k_i$ given by $k_i/N = f_i/f_S = f_i \times T_s$, where $k_i$ is a rank number indicating one of the nominal signalling frequencies, $f_i$ is the relevant nominal signalling frequency, N is the number of samples over which the DFT is calculated, $f_S$ is the sampling frequency, and $T_s$ is the sampling interval.

For a DFT it may generically be written:

$$F(k) = \sum_{n=0}^{N-1} f(n,T_s)\{\cos(2\pi f_i T_s)n - j\sin(2\pi f_i T_s)n\}$$

where n is the rank number of a sample of the series of N samples, and $f(n,T_s)$ is the $n^{th}$ sample of this series.

It is generally known, for example from the above-quoted articles by Harris, that a result of a calculation over a series of N samples can be improved in DFT by using so-called Kaiser-Bessel window functions. A function of this type is generally given by:

$$W(n) = \frac{I_o[\pi \cdot a(1,0 - (n/0.5\,N)^2)^{\frac{1}{2}}]}{I_o(\pi \cdot a)}$$

where $$I_o(x) = \sum_{l=0}^{\infty} [(x/2)^l/l!]^2$$

represents the so-called modified zero-order Bessel function. The properties of the window function are in the main determined by the choice of the parameters a and N. A frequency response is obtained by determining the modulus $|F(k)|$ as the root of the sum of the squares of the two parts $$\sum_{n=0}^{N-1} W(n)\cos(2\pi nk/N) \text{ and } \sum_{n=0}^{N-1} W(n)\sin(2\pi nk/N).$$

It appears that the "height" of the side lobes belonging to a main lobe, and also the width of this main lobe are chiefly determined by the choice of the parameter a, while the "height" (the maximum or top) of the main lobe is dependent on the magnitude of the parameter N. It is customary in describing the filter characteristics to use a frequency interval (bin) normalized on the centre frequency (nominal frequency) of a main lobe. A bin is defined as a fundamental frequency interval, $f_S/N = 1/NT$ Hz.

In a touch-tone signalling system the nominal signalling frequencies that are divided over the two different frequency bands, i.e. the low-band subgroup and the high-band subgroup, typically occur with different mutual differences in the frequency spectrum. The bandwidths of the different detectors are also mutually different. Further, for detection in a touch-tone signalling system it is necessary to take account of the possible presence of a strong call tone (nominal 150 and 450 Hz). With a TDK telephone set it is usual to switch the microphone off when a key on the keyboard is pressed and a combination of two signalling frequencies is sent out. Apart from this precautionary measure, a TDK signalling receiver should be equipped to guard against the influence of speech and background noise. Speech and background noise can reach the input of a signalling receiver during the phase in which a connection is being built up. Such speech and background noise have the following possible sources:

(1) previous to the dialling (selection) of the first digit and between the selection of successive digits, the microphone and the subscriber's set is connected with the subscriber line; and (2) during the time that the signalling receiver is connected, crosstalk on the subscriber lines can also cause interfering signals to reach the input of this signalling receiver. Such interfering signals, such as speech or background noise, can disturb the proper operation of the signalling receiver through the crossover of calling tones. On the one hand, such interfering signals may contain components which, in frequency, amplitude and duration, may be interpreted as valid, and on the other hand such signals may lead to the rejection of a valid signal that is present.

Figure 5:
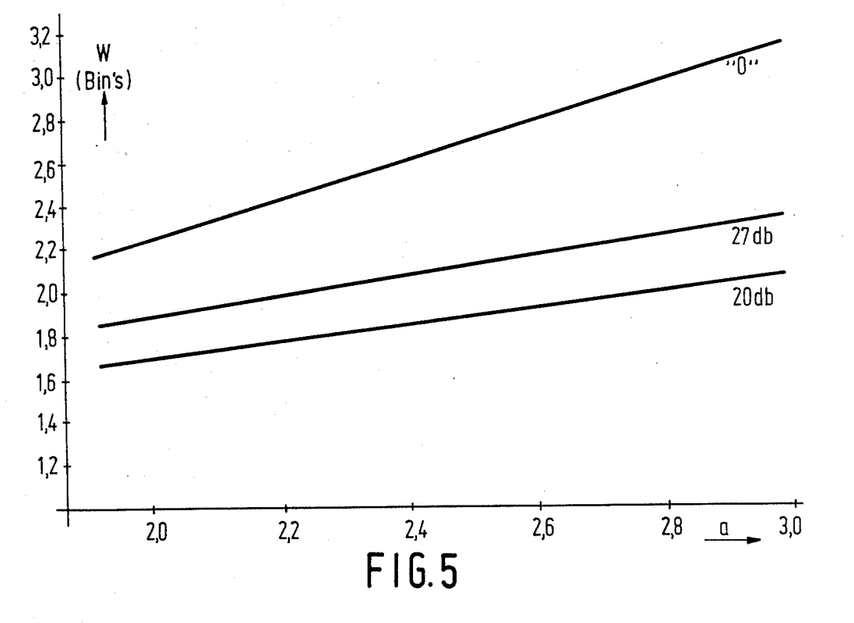
FIG. 5 shows a graph giving the relation between the parameter a of a Kaiser-Bessel window function and the width of the main lobe, with corresponding attenuations for a neighbouring frequency.

The spurious-signal guard function, also referred to as speech guard function, is fulfilled in a signalling receiver according to the present invention by provisions which, on the basis of the results of the eight digital signal-processing devices, determine the two largest of these results and add together the energy contents of the other six of these devices and then comparing the sum result with a threshhold value which is derived from the two largest detected results. It is advantageous for this purpose to use a device which makes available the sum result of the squared results of these digital signal processing devices other than those that possess the largest energy content. It has been found that for the detection of one of the nominal signalling frequencies in the low-band subgroup and in the high-band subgroup, respectively, a number N of respectively 256 and 144 samples of the input signal must be taken and that the lowest value that can be used for the window parameter a is a=2. In connection with the speech guard function, it is necessary to analyse the largest possible frequency band. To this end, however, each detector should introduce a high attenuation for a neighbouring signalling frequency of the same subgroup. The smallest value for the minimum frequency distance $\Delta f$ between a nominal signalling frequency and a frequency that limits the bandwidth of the neighbouring detector applied to the lowest frequencies from the low-band subgroup, i.e. the frequencies 697 and 770 Hz. Assuming that the half bandwidth of each of the detectors is given as 1.5% (of the relevant nominal signalling frequency) plus 2 Hz, the said minimum frequency distance $\Delta f$ of the detector for the nominal signalling frequency is 697 Hz when $\Delta f = 59.5$ Hz. As illustrated in FIG. 5, tables have been calculated from which, for different values of the window parameter a, the attenuation can be read for a detector at a given value of the above-mentioned minimum frequency distance $\Delta f$ expressed in bins. It follows from FIG. 5, for example, that for a minimum attenuation value of 30 dB to be introduced for a nominal neighbouring frequency, for a value $a=2$, the minimum frequency distance $\Delta f$ must be about 2 bin. The number N of samples that has to be taken of the relevant signal is then given by $N = T_S \times 2/\Delta f = 0.000125 \times 2/59.5 = 256$. This assumes a sampling frequency $f_S$ of 8000 Hz or a sampling interval $T_S$ of 125 $\mu$s. Choosing the nearest binary number, it then follows that the number of samples is $N=256$. In a similar manner it follows for the high-band subgroup that the smallest value for $\Delta f$ is approximately 105 Hz. In this connection the DFT for the detectors of this high-band should be carried out over a number N of 144 samples ($144 = 256 \times 697/1209$).

Assuming that a digital signal processing device is available that is capable of repeatedly carrying out a DFT over 128 samples within a frame time interval of 125 $\mu$s, there should be a provision that will make it possible, even in a situation where 256 samples have to be taken of an input signal, for calculating a DFT over this number. For this purpose, according to one aspect of the invention, the signal receiver is equipped for reading out from the input memory 3 for each of the last 256 samples of the eight channels stored, only the even or only the odd numbered samples, so that in fact only 128 or 72 samples, respectively, are involved in the DFT operations. This negation of half the number of available samples amounts in fact to halving the sampling frequency from 8000 Hz to 4000 Hz. The form of a frequency response characteristic, also referred to as the detector response, is not affected by this; however, the response over the frequency band from 0-2000 Hz is mirrored with respect to 2000 Hz. This means, for example, that a detector which responds to a frequency $f_1$ gives the same result for a frequency 4000-$f_1$. Such mirroring is advantageous for the speech guard function since the analysed frequency range is thereby doubled.

As appears from FIG. 5, the digital signal guard device designed for the nominal signalling frequency of 697 Hz introduces an attenuation of 27.5 dB at the values $N=256$ and $a=2$ for a minimum frequency distance $\Delta f=59.5$ Hz. The maximum attenuation in the passband is thereby smaller than 1 dB. According to a further aspect of the invention, for each of the digital signal processing devices designed for the nominal signalling frequencies of the low-band subgroup the window parameter a is chosen such that all these devices at a frequency distance $b_1 = \Delta f$ introduce an attenuation $d_1$ which in principle has the same value. This is an advantageous feature for the speech guard. The foregoing is summarized below in table 1.

TABLE 1

| $f_{Nom}$ | a | $b_1$ (Hz) | $bb_1$(bin) | $b_2$(Hz) | $bb_2$(bin) | $d_1$(dB) | $d_2$(dB) |
|---|---|---|---|---|---|---|---|
| 697 | 2.00 | 59.45 | 1.90 | 12.46 | 0.40 | 27.6 | 0.93 |
| 770 | 2.10 | 60.55 | 1.94 | 13.55 | 0.43 | 27.1 | 1.03 |
| 852 | 2.60 | 68.45 | 2.19 | 14.78 | 0.47 | 27.3 | 1.03 |
| 940 | 3.00 | 74.22 | 2.37 | 16.12 | 0.51 | 27.4 | 1.06 |

In this Table:
$f_{Nom}$ is the nominal signalling frequency
a = parameter of the Kaiser-Bessel window function
$b_1$ = minimum frequency distance $\Delta f$ between relevant nominal signalling frequency and a frequency that limits the bandwidth of the neighbouring detector
$bb_1$ = the same as $b_1$ but now expressed in bins ($bb_1 = b_1 \times N \times T$)
$b_2$ = detected bandwidth in Hz (1.5% nominal frequency +2 Hz).
$bb_2$ = the same as $b_2$ but now expressed in bins
$d_1$ = attenuation at the distance $bb_1$
$d_2$ = attenuation at the distance $bb_2$.

In Table 2 below the above-mentioned values are summarized for the DFT devices of the high-band subgroup.

TABLE 2

| $f_{Nom}$ | a | $b_1$(Hz) | $bb_1$(bin) | $b_2$(Hz) | $bb_2$(bin) | $d_1$(dB) | $d_2$ (dB) |
|---|---|---|---|---|---|---|---|
| 1209 | 2.00 | 104.96 | 1.89 | 20.14 | 0.36 | 27.2 | 0.75 |
| 1336 | 2.05 | 106.87 | 1.92 | 22.04 | 0.40 | 27.3 | 0.91 |
| 1477 | 2.50 | 118.96 | 2.14 | 24.16 | 0.43 | 27.3 | 0.88 |
| 1633 | 3.00 | 131.85 | 2.37 | 26.50 | 0.48 | 27.4 | 0.94 |

According to an important aspect of the present invention, the digital processing devices of the signalling receiver are implemented in such a way that two side lobes are added to each main lobe whose maximum is centered on one of the relevant nominal signalling frequencies, the side lobes added to the main lobes for the low-band subgroup and high-band subgroup, respectively being situated respectively below and above the frequency band occupied respectively by the low-band subgroup and the high-band subgroup. Thus, to the eight detectors for the eight nominal signalling frequencies there are in fact four detectors added which operate at the limits of the low-band subgroup and the high-band subgroup. The results of these four detectors are then comprised in the speech guard described in the foregoing. By such an addition of four detectors the frequency spectrum analysed for the speech guard function is appreciably widened. A further widening is obtained by making the response of these four added detectors as wide as possible.

The requirements to be placed on these four added detectors are the following:

a. the detector operating at the underside of the low-band should introduce a relatively high attenuation for calling tones (maximum 470 Hz);

b. the detector operating at the upper side of the low-band should introduce a high attenuation for the frequency of 1188.8 Hz that forms the lower limit of the detection bandwidth of the digital signal processing device for the lowest nominal signalling frequency (1209 Hz) of the high-band;

c. the detector operating at the underside of the high-band should introduce high attentution for the frequency that forms the upper limit of the detection bandwidth of the digital signal processing device for the highest nominal signalling frequency (941 Hz) of the low-band;

d. the detector operating at the upper side of the high-band should introduce a high attenuation for the mirror frequency of 2000 Hz; and e. for all four of these added detectors the attenuation for the neighbouring frequency should be greater than 27 dB.

It has been found that for these four added detectors the window parameter a has its maximum useful value value at a=3.6. Extrapolating from the graph in FIG. 5 results in that at a=3.6 and a number of samples N=256 an attenuation of 27.5 dB is introduced at a frequency distance of 2.62 bin. It follows from this that the minimum frequency distance $\Delta f$ between the nominal frequency of the relevant detector that has to be added to the low-band and the frequency that forms a limit for the detection bandwidth of the detector for the neighbouring nominal signalling frequency is given by $\Delta f = (\text{bins} \times f_S)/N = (2.62 \times 8000)/256 = 81.87$ Hz. The lowest limit frequency of the low-band is given by $697 - 12.46 = 684.5$ Hz. The nominal frequency of the extra detector that must be added to the underside of the low-band is thus given by 684, $-81.87 \approx 603$ Hz. The attenuation introduced at the frequency of 470 Hz is here >90 dB.

The highest limit frequency of the low-band is given when $941 + 16.12 = 957.1$ Hz. The nominal frequency of the added detector that must operate at the upper side of the low-band is then given when $957.1 + 81.87 \approx 1039$ Hz. The attenuation introduced at the frequency 1188.8 Hz is then >90 dB.

The lowest limit frequency of the high-band is given when $1209 - 20.14 = 1188.8$ Hz. The extra detector at the underside of the high-band then has a nominal frequency given by $1188.8 - 81.87 = 1107$ Hz. The attenuation for the frequency 957.1 Hz is then >90 dB.

The added detector for the upper side of the high-band must then be dimensioned for a number of samples N=144. From this there follows a value for the minimum frequency distance $\Delta f$ given as $\Delta f = (2.62 \times 8000)/144 = 145.5$ Hz. The nominal frequency of this added detector for operation at the upper side of the high-band is then given as $1659.5 + 145.5 = 1805$ Hz. The attenuation at 2000 Hz is then >63 dB.

Figure 3:
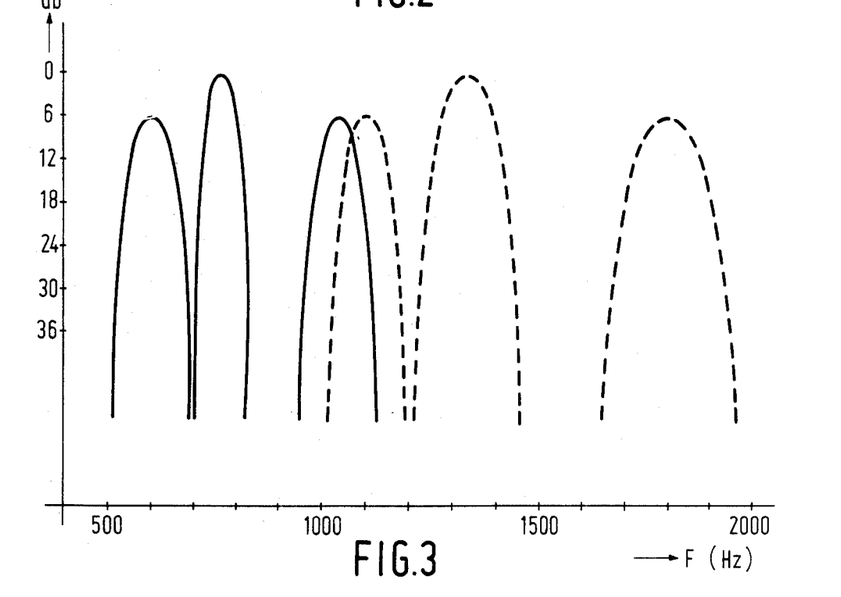
FIGS. 3 and 4 show families of frequency response characteristics of parts of a DFT system such as used in a receiving equipment according to the invention.

FIG. 3 illustrates the frequency response of the digital signal processing devices for the nominal signalling frequency of 770 Hz and 1336 Hz, respectively, on the main lobe to which the two side lobes have been added for the four added detectors described in the foregoing.

Figure 4:
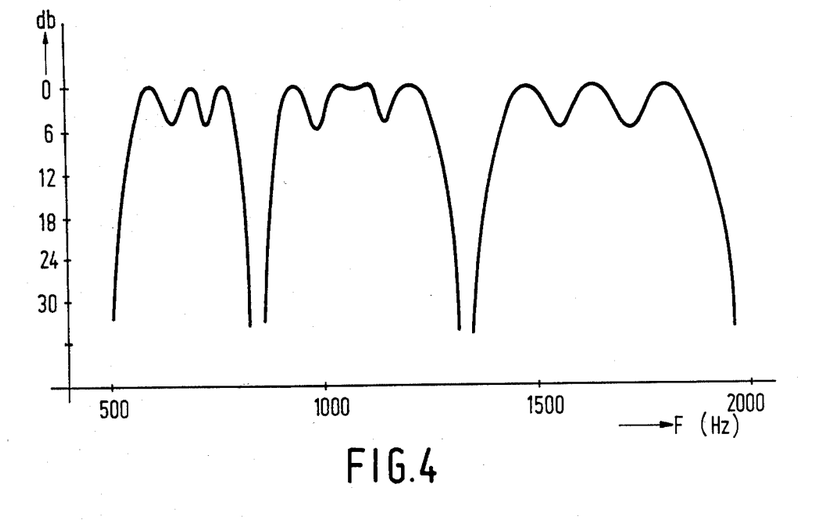

FIG. 4 illustrates the speech detection characteristic formed by the frequency responses and which is operative with a signalling code formed from the nominal signalling frequencies of 852 and 1336 Hz, and whereby an extra filter has been added at the underside and upper side of the low-band and high-band respectively. FIG. 4 also illustrates that the points where neighbouring lobes of the speech detection characteristic intersect each other lie at practically the same level. The window functions chosen for this purpose can correct possible variations in the heights of the lobes mutually, including those of the side lobes added at the limits of the low-band and the high-band. A point of intersection at the aforesaid level is also given by the side lobe added to the upper side of the low-band and the side lobe added at the lower side of the high-band.

The block diagram of the signalling receiver given in FIG. 1 illustrates a physical components structure for implementing the functions described in the foregoing.

In this diagram the box 3 denotes a freely accessible input memory with a storage capacity of 256 samples for each of the eight channels. The input and output of this input memory are regulated from a control unit 4. This control unit comprises a part 5 thereof for reading out the input memory in such a way that, for example, only the odd numbered samples are read out from a series of 256 channel samples. This constitutes in fact a halving of the number of signal samples read in per observation window of 32 ms ($256 \times 125$ $\mu$s), which means that frequency components above 2 kHz, also have an influence. Since the response is mirrored relative to 2 kHz, frequency components between 2300 and 2850 Hz and 3020 and 3340 Hz will contribute to the result of the speech detector.

The samples read out from the input memory are representative of PCM input signals. For the implementation of the DFT's it is recommendable to have the input signals available in linear form. To this end the signalling receiver contains a converter 6 which is equipped to linearize the input signals fed into it. At the output of the converter 6 a linearized input signals $a_i$ appears with a range of values from $-2047 - +2047$. In this way only 12 of the 16 available bit positions are used. The 12 bit input samples thus linearized are fed to the digital signal processing devies, going respectively to the inputs 7 and 8 in two product accumulators of said devices. Fed to the other inputs of these product accumulators are 8-bit coefficients $b_i$ and $c_i$ respectively. The coefficients required for implementing the DFT's are precalculated and stored in two coefficient memories 9 and 10. In total these are required to store $4 \times 2 \times 128$ words of 8 bits for the low-band and $4 \times 2 \times 72$ words of 8 bits for the high-band. For simplicity, however, $4 \times 2 \times 128$ words are also stored for the high-band, for which purpose the $4 \times 2 \times 72$ words are supplemented with zeros. To obtain the frequency response characteristics, or speech detection characteristics as they are also called, of the form shown in FIG. 4, these coefficients are given as the product of the relevant sine and cosine coefficients, respectively and the corresponding window coefficients, in accordance with the following formulae:

$$b(i) = W_1(n,T)\sin(2\pi fTn) + \frac{1}{\sqrt{3}} W_2(n,T)\sin(2\pi \cdot 603 \cdot t \cdot n) +$$

$$\frac{1}{\sqrt{3}} W_3(n,T)\sin(2\pi \cdot 1039T \cdot n)$$

$$c(i) = W_1(n,T)\cos(2\pi fTn) + \frac{1}{\sqrt{3}} W_2(n,T)\cos(2\pi \cdot 603 \cdot T \cdot n.) +$$

$$\frac{1}{\sqrt{3}} W_3(n,T)\cos(2\pi \cdot 1039\ T \cdot n)$$

for the low-band $$b'(i) = W_1'(n,T)\sin(2\pi fT \cdot n) +$$

$$\frac{1}{\sqrt{3}} W_2'(n,T)\sin d(2\pi \cdot 107T \cdot n) +$$

-continued $$+ \frac{1}{\sqrt{3}} W_3'(n,T)\sin(2\pi \cdot 1805 \cdot T \cdot n)$$

$$c'(i) = W_1'(n,T)\cos(2\pi f T \cdot n) +$$

$$\frac{1}{\sqrt{3}} W_2'(n,T)\cos(2\pi \cdot 1107 \cdot T \cdot n) +$$

$$\frac{1}{\sqrt{3}} W_3'(n,T)\cos(2\pi \cdot 1805 \cdot T \cdot n)$$

for the high-band. In other words, for each nominal signalling frequency it is necessary to store 128 words for the sine terms and 128 words for the cosine terms. Chosen for this are the Kaiser-Bessel window functions W1, W2, W3; $W'_1$, $W'_2$, $W'_3$ etc. in accordance with the descriptions given in the foregoing. Each of the product accumulators 7, 8 operates under the control of the control unit 4 in determining the DFT for the relevant nominal signalling frequency from the presented series of 128 signal samples b(i) and c(i) of the coefficient memories 9 and 10, respectively, in accordance with $$x = \sum_{i=0}^{127} a(i) * b(i)$$

for the product accumulator 7, and in accordance with $$y = \sum_{i=0}^{127} a(i) * c(i)$$

for the product accumulator 8. Here the x term and the y term are representative of the imaginary and real parts respectively of the relevant DFT, the filter result for the relevant nominal frequency then being given as the modulus of this DFT, which modulus in this exemplary embodiment is determined as the root of the sum of the squares of these real and imaginary parts of the relevant DFT. For this purpose an available 8-bit microprocessor 11 can be used, such as for example the Z-80. The operation can be split into the following two parts:

1. Conversion of the parts of the DFT available in linear form and the outputs of the product accumulators into a logarithmic 8-bit wide form. Such a conversion offers the advantage that fewer bits are then necessary so that the actual calculations are simplified.

2. Application of an operation whereby the root of the sum of the squares is determined. In order that the 24-bit-wide numbers that are available at the outputs of the product accumulators can be converted into logarithmic form, so that a microprocessor of the aforesaid type can perform the further operations, a conversion known in the art as piecewise linear approximation can be carried out. In forming the real and imaginary parts of the relevant DFT it is permissible, before causing the said logarithmic conversion to take place, to eliminate the seven least significant bits from the presented signal samples as well as the corresponding character bit, so that for the following operations there are available 16-bit-wide numbers from which the logarithmic form can be determined. It is noted here that the product coefficients $b_i$ and $c_i$, respectively, and more in particular the products of the sine and cosine terms and the relevant window function, are truncated to 8-bit-wide words in two's complement form. Proceeding from the 16-bit-wide numbers available in linear form in the product accumulators 7 and 8, the modulus m of the relevant DFT is given by $$m = 16 \cdot {}^2\log \frac{\sqrt{x^2 + y^2}}{8}$$

Such a logarithmic operation can be performed by the processor 12 which may form part of the digital signal processing device and which may also form part of the microprocessor indicated in its generality by block 11.

The two product accumulators 7 and 8 are capable of processing the series of 128 signal samples and product coefficients presented to it into time intervals of 125 microseconds. This means that for calculating 8 DFT's or for eight nominal signalling frequencies, a time interval of 1 ms is required and for processing eight channels time intervals of 8 ms are required. As remarked in the foregoing, the DFT's are calculated in overlapping form, which implies that each new DFT calculation is performed partly over the same samples as those that were involved in the previous DFT calculation, so that in every interval of 8 ms new information is obtained about the input signal. In each calculation, proceeding from 256 read-in signal samples, each time interval of 32 ms thus involves 24 ms of "old" signal and 8 ms of "new" signal. This overlapping detection is also controlled by the control unit 4.

With the digital signal processing device described in the foregoing it is achieved that the results of every eight such digital signal processing devices also termed speech detectors, are available as 8-bit-wide logarithmic numbers which are stored in the memory of the microprocessor 11. From this, both for the low-band and for the high-band, the largest of the relevant four results is determined, denoted respectively by IZL and IZH. The microprocessor 11 is further equipped for performing the three following determinations:

1. Determination of whether IZL or IZH, respectively, is greater than a threshold value $L_1$;

2. determination of whether the difference between the values IZL and IZH is smaller than a threshold value $L_2$; and 3. determination of whether the result of the speed detector is smaller than a threshold value $L_3$.

The resulting produced by the relevant speech detectors are calculated from the aforesaid available results produced by all of the eight detectors, on the understanding that when it has been determined for the low-band and the high-band which detectors have produced the largest results, the results of the relevant speech detectors are determined by calculating from the other six detector results the root of the sum of the squares, so that these individual detectors are essentially combined into a composite speech detector with a broadband characteristic. The speech detector result is then obtained by adding together the 6-bit-wide numbers produced by the processor 12 and which are representative of the aforesaid other six detector results.

The threshold value $L_1$ and $L_2$ are determined on the basis of the following considerations. In the first place, the absolute levels of the signals in a TDK signalling system are established. These levels are defined relative to a selected level A. The maximum level of a TDK signal is given by
 (a) two components with a level of A+25 dBm;
 (b) a call tone with a level of A+22 dBm; and
 (c) spurious components with a level of A+25-20 dBm.

In a PCM system the maximum level should be lower than 0 dBm. In this connection, A= −34 dBm has been chosen, so that the TDK frequency response components have an absolute level between −34 and −0 dBm. The call tone has a maximum level of −12 dBm. By now normalizing the detector results with respect to the maximum detector result, the following values can be established for the thresholds $L_1$ and $L_2$:

$$L_1 = 80 \times -0.376 = -30.08 \text{ dB}$$

and $$L_2 = 25 \times -0.376 = -9.40 \text{ dB}.$$

The value of the threshold $L_3$ is established by determining the maximum result of the speech detector in the presence of a valid combination of nominal signalling frequencies. Such a maximum result arises when: two nominal signalling frequencies are present with a maximum frequency deviation such that these signals come through maximally via two neighbouring detectors (attenuation −27.1 dB), and spurious components exist with a level of 20 dB below the low-band component with a minimum level of −50 dB. Taking account of the imposed CEPT standards, this noise threshold $L_3$ is fixed at −17.25 dB below the level of the largest result IZL of the low-band, with a minimum of −42 dBm. When a result of the speech detector described in the foregoing turns out to be larger than this noise threshold $L_3$, the presented channel signal from which this speech detector result is derived is then rejected.

When the speech detector result is smaller than this noise threshold and the detector results IZL and IZH satisfy the requirements specified under (1) and (2) in the foregoing, it must be established whether the so-called character recognition condition exists. If this condition does exist, there appears at the output of the signalling receiver the correct signalling code. In this connection the signalling receiver is equipped for implementing a routine by means of which the imposed time requirements are satisfied by whether or not the so-called signal condition follows, that is the state at the input of the signalling receiver that exists when a signal at its input corresponds to a valid signal accompanied by an acceptable amount of unwanted frequencies, so that a decision can be made as to the validity of the signal. As described in the foregoing, a decision is made every 8 ms by the described signal condition operations as to whether or not one of eight signal conditions exists. To implement the aforesaid routine, which must be run in a connection with the time requirements imposed, the signalling receiver is further designed such that a channel signal of short duration (<20 ms) results at the most in a decision indicating that a signal condition exists. In order for a character recognition condition to arise it is therefore required that the same signal condition be present at least twice in succession. A signal interruption (<20 ms) has the result that at the most five times in succession a decision is taken indicating that the signal condition does not exist.

The decision that the character recognition condition does not exist may thus only be taken when six times in succession a different signal condition arises than that which gave rise to the existence of the character recognition condition. The occurrence twice in succession of the same signal condition results in this case too in a decision that a character recognition condition exists. When a routine as described above has led to the decision that a character recognition condition is present, an output message is composed which is sent out for further processing via the output unit indicated by 13 in FIG. 1.

In the example of an embodiment of a signalling receiver according to the invention as described in the foregoing, a frequency spectrum of approx. 550 Hz to 1900 Hz is analysed for the purposes of the speech guard by the addition of said side lobes to each of the frequency responses of the DFT digital signal processing devices. Such a speech detection response also occurs in mirrored form around 2 kHz when in the manner described a sampling frequency of 4 kHz is applied. In this way the selectivity of the devices is also appreciably improved. The aforesaid can be achieved with a physical components structure similar to that of a signalling receiver as described in aforesaid Netherlands patent application, without said component structure having to be expanded.

It is consequently possible in principle to combine receiving equipments for TDK pushbutton signalling on the one hand and for MFC signalling on the other into a unit wherein each of the relevant receivers operates either as a TDK receiver or as an MFC receiver. For both types of receiver mainly the same physical components and the same routines incorporated therein can be used. The coefficients for both the TDK and the MFC receiver are stored and held available in the coefficient memories (PROM). The microprocessor 11 is correspondingly equipped for implementing the various test routines that are needed for both types of receiver.

What is claimed is:

1. In a telephone receiving equipment for recognizing a number of different combinations of a plurality of nominal voice-frequency signalling components, such signalling components being in a frequency band which is divided into two subgroups; said equipment comprising a plurality of Discrete Fourier Transform (DFT) digital signal-processing devices each having a frequency response characteristic with a main lobe at a frequency corresponding to that of one of the signalling frequency components to be detected by such device, and a processor adapted to process the outputs of the digital signal-processing devices to determine the two signalling frequency components which are received with the greatest strength and to evaluate the outputs of the signal processing devices for the remaining signalling frequency components so as to provide a voice-signal guard function; the improvement characterized in that:

the frequency response characteristic of each of said DFT digital signal-processing devices has a first side lobe and a second side lobe, each lobe having a top, the tops of the first and second side lobes being respectively situated below and above the subgroup frequency band which includes the signalling frequency component to be detected by such device; and said processor is adapted to (a) successively add the outputs of a number of the signal processing devices so as to derive a sum which is representative of the total energy content of all the received signalling frequency components other than the two of such components which are received with the greatest strength, and (b) compare such sum with a threshold value derived from one of said two signalling components which are received with the greatest strength.

2. Receiving equipment as claimed in claim 1, characterized in that each of the digital signal-processing devices has a detection bandwidth which is limited for detecting the signalling frequency component corresponding thereto, and each such device provides attenuation over the minimum frequency distance between the signalling frequency component corresponding thereto and the frequency at which the detection bandwidth of the signal processing device for the nearest adjacent signalling frequency component is limited, such attenuation being substantially the same over such frequency distance.

3. Receiving equipment as claimed in claim 1, characterized in that in each of the digital signal-processing devices the tops of the two side side lobes thereof are approximately 6 dB lower than the top of the main lobe thereof.

4. Receiving equipment as claimed in claim 1, characterized in that the shape of the frequency response characteristic of each of the digital processing devices is a Kaiser-Bessel window function.

5. Receiving equipment as claimed in claim 4, characterized in that the frequencies of the tops of the side lobes of the signal-processing devices for signalling frequency components in the lowest frequency band subgroup and in the highest frequency band subgroup, respectively, are respectively at 603 Hz and 1039 Hz and at 1107 Hz and 1805 Hz.

6. Receiving equipment as claimed in claim 1, further comprising a memory device for the temporary storage therein of a number of samples of a received signalling frequency component, and read-out means for alternately reading out half the number of samples stored in the memory device, upon each such read-out the closest adjacent read-out sample being negated.

7. Receiving equipment as claimed in claim 2, characterized in that in each of the digital signal-processing devices the tops of the two side lobes thereof are approximately 6 dB lower than the top of the main lobe thereof.

8. Receiving equipment as claimed in claim 2, characterized in that the shape of the frequency response characteristic of each of the digital processing devices is a Kaiser-Bessel window function.

9. Receiving equipment as claimed in claim 3, characterized in that the shape of the frequency response characteristic of each of the digital processing devices is a Kaiser-Bessel window function.

10. Receiving equipment as claimed in claim 2, further comprising a memory device for the temporary storage therein of a number of samples of a received signalling frequency component, and read-out means for alternately reading out half the number of samples stored in the memory device, upon each such read-out the closest adjacent read-out sample being negated.

11. Receiving equipment as claimed in claim 3, further comprising a memory device for the temporary storage therein of a number of samples of a received signalling frequency component, and read-out means for alternately reading out half the number of samples stored in the memory device, upon each such read-out the closest adjacent read-out sample being negated.

* * * * *